United States Patent [19]

Ohsawa

[11] Patent Number: 5,278,606
[45] Date of Patent: Jan. 11, 1994

[54] CAMERA

[75] Inventor: Toshifumi Ohsawa, Tokyo, Japan

[73] Assignee: Canon Kabushiki Kaisha, Tokyo, Japan

[21] Appl. No.: 990,539

[22] Filed: Dec. 14, 1992

Related U.S. Application Data

[63] Continuation of Ser. No. 707,592, May 30, 1991, abandoned.

[30] Foreign Application Priority Data

Jun. 7, 1990 [JP] Japan .................................. 2-149205

[51] Int. Cl.⁵ .............................................. G03B 17/18
[52] U.S. Cl. .................................................... 354/475
[58] Field of Search ............... 354/465, 466, 467, 468, 354/469, 470, 471, 472, 473, 474, 475, 289.1, 412, 289.12

[56] References Cited

U.S. PATENT DOCUMENTS

| | | | |
|---|---|---|---|
| 4,423,934 | 1/1984 | Lambeth et al. | 354/412 |
| 4,692,005 | 8/1987 | Takami | 354/289.1 |
| 4,814,812 | 3/1989 | Nakajima et al. | 354/289.1 |
| 4,853,733 | 8/1989 | Watanabe et al. | 354/289.1 |

*Primary Examiner*—W. B. Perkey
*Attorney, Agent, or Firm*—Robin, Blecker, Daley & Driscoll

[57] ABSTRACT

A camera having a display device for displaying a body number of the camera is arranged to store identification information peculiar to the camera such as the body number, etc. in a rewritable memory and to display the identification information by reading it out from the memory.

4 Claims, 3 Drawing Sheets

CAMERA

This is a continuation application under 37 CFR 1.62 of prior application Ser. No. 707,592, filed May 30, 1991, now abandoned.

BACKGROUND OF THE INVENTION

1. Field of the Invention

This invention relates to a display device of a camera for displaying information concerning the camera.

2. Description of the Related Art

Like other industrial products, an individual camera has a manufacturer's serial number, etc., inscribed on its body. More specifically, it is generally practiced to provide a camera user or a repairer with identification information showing some particularities that are peculiar to each individual product such as a body number, the time of manufacture, a stratification symbol based on the place of manufacture, etc., by inscribing or printing such information on an exterior part of the camera body.

However, the exterior part of the camera body tends to be damaged and is often replaced at the time of repair. The inscribed or printed information is thus occasionally lost in its entirety and is replaced with new information when the particular exterior part is replaced. This has often caused inconveniences to the users of the products as well as the manufacturers. Further, it has been undesirable in respect of cost to inscribe different numbers on individual camera bodies.

Meanwhile, the conventional display devices of cameras have not always been fully multifunctional, because the displays available from them are limited to information that is related only to photo taking.

SUMMARY OF THE INVENTION

It is one aspect of this invention to provide a display device for a camera which is arranged to retain information peculiar to the camera even in cases where an exterior part of the camera is replaced.

It is another aspect of the invention to provide a display device for a camera which is arranged to permit information peculiar to the camera to be rewritten or renewed and to be capable of displaying the rewritten information peculiar to the camera.

It is a further aspect of the invention for attaining the above-stated objects of the invention to provide a camera comprising, a memory which is arranged to store information peculiar to the camera such as a manufacturer's serial number etc., and a display device for displaying the information stored in the memory.

These and other aspects and features of this invention will become apparent from the following detailed description of an embodiment thereof taken in connection with the accompanying drawings.

DETAILED DESCRIPTION OF THE PREFERRED EMBODIMENT

Figure 1A:
FIGS. 1(a) to 1(d) are plan view showing by way of example various displays made by the display device of a camera which is arranged according to this invention as an embodiment thereof.
Figure 1B:
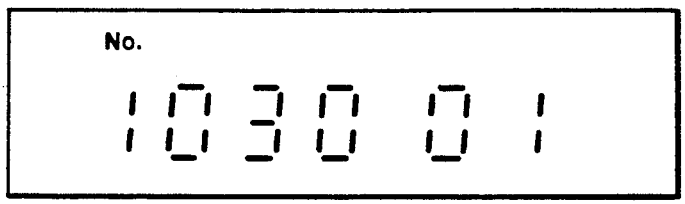
Figure 1C:
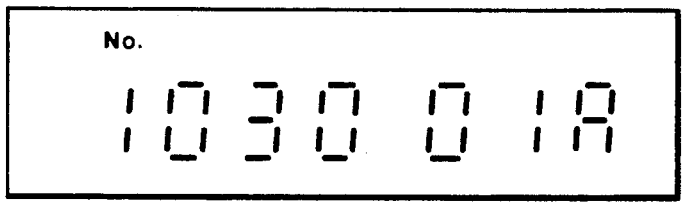
Figure 1D:

FIGS. 1(a) to 1(d) show by way of example displays made by the display device of a camera to which this invention is applied. The display shown in FIG. 1(a) indicates exposure information obtained under a normal photo-taking condition showing a shutter speed at 1/2000 sec and an aperture value at F=5.6. The display shown in FIG. 1(b) is made under a condition other than photo-taking conditions, indicating by way of example a body number "No. 103001" peculiar to an individual camera. FIGS. 1(c) and 1(d) show examples where suffixes are added to the body number, indicating as "No. 103001A" and "No. 103001b" respectively.

Figure 2:
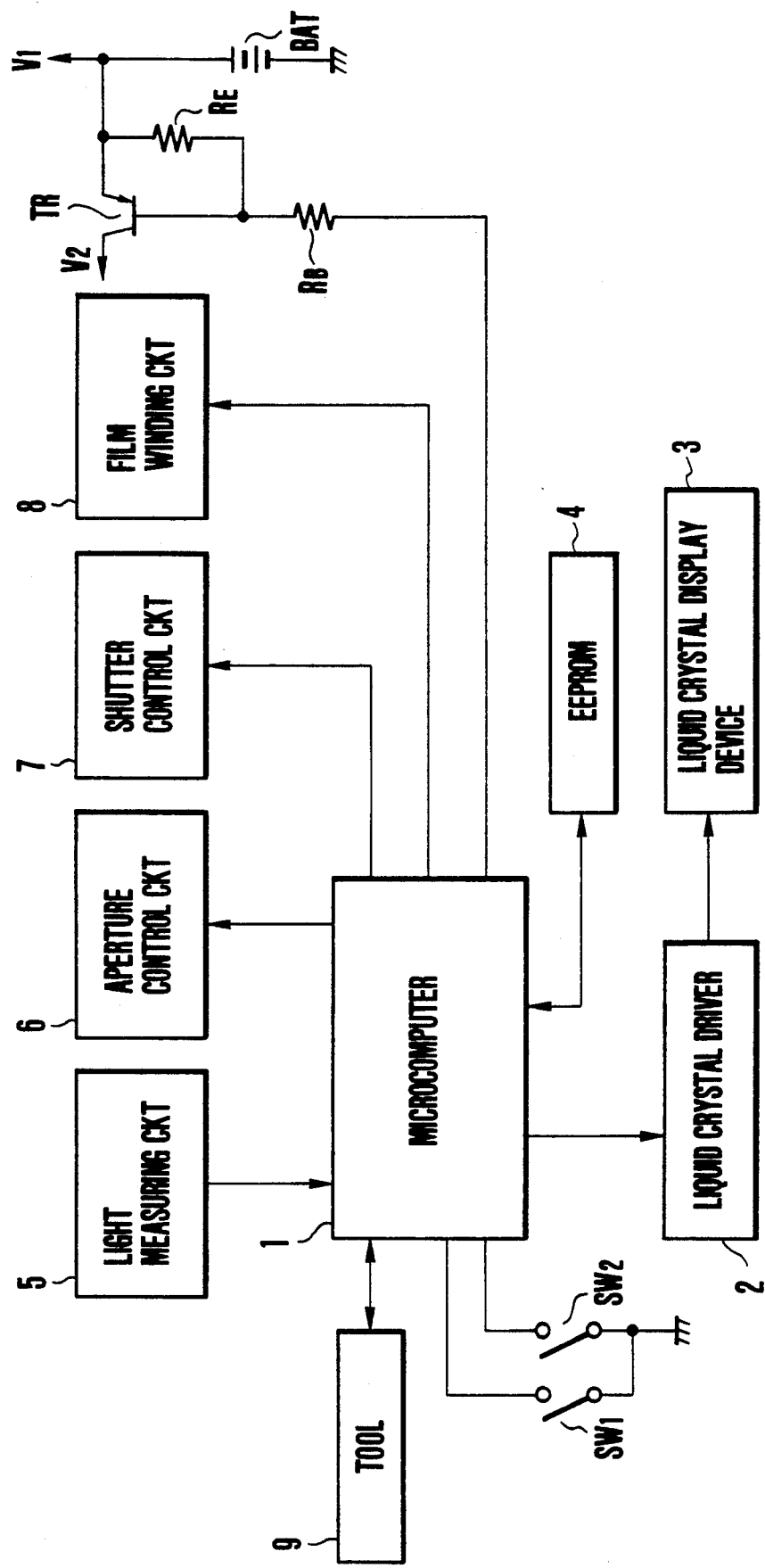
FIG. 2 is a block diagram showing the arrangement of the embodiment.

FIG. 2 shows by way of example an electric circuit arrangement of the camera arranged according to this invention. The illustration includes; a microcomputer 1 which is arranged to perform sequence control over the operation of the camera; a liquid crystal driver 2; a liquid crystal display device 3; an electrically erasable programmable read-only memory 4 (hereinafter referred to as EEPROM); a light measuring circuit 5; an aperture control circuit 6; a shutter control circuit 7; and a film winding device 8. A main switch SW1 is arranged to operate in response to a first stroke operation of a shutter release button of the camera. The camera becomes operative when the main switch SW1 turns on and inoperative when it turns off. A release switch SW2 is arranged to turn on to permit a shutter release in response to a second stroke operation of the shutter release button. A battery BAT serves as a power source of the camera. The output V1 of the battery BAT is arranged to be constantly supplied to the microcomputer 1 and the liquid crystal driver 2. A PNP transistor TR is arranged to turn on to generate a power supply voltage V2 when the level of its base is lowered by the microcomputer 1. The power supply voltage V2 is applied to the EEPROM 4 and each of the circuits including the light measuring circuit 5 to the film winding device 8. The camera is arranged in this manner.

A reference numeral 9 denotes a tool used at a factory or by a repairer. The tool 9 is arranged to be capable of conducting data communication with the microcomputer 1 of the camera. The contents of the EEPROM 4 can be rewritten or renewed through this data communication. The camera is of course not always provided with the tool 9.

Figure 3:
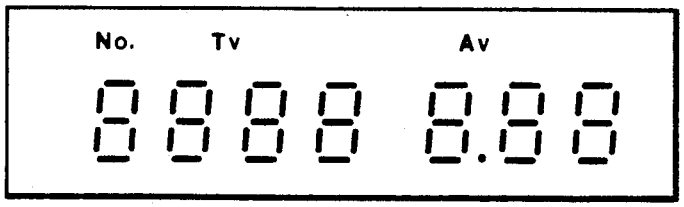
FIG. 3 is a plan view showing all the segments of the display device.

FIG. 3 shows by way of example, the details of the liquid crystal display device 3 which is included in FIG. 2. The device 3 comprises seven sets of 7-segments L-each of which is arranged in the shape of "8"; one decimal point; and additional segments indicating "No.", "Tv" and "Av".

Figure 4:
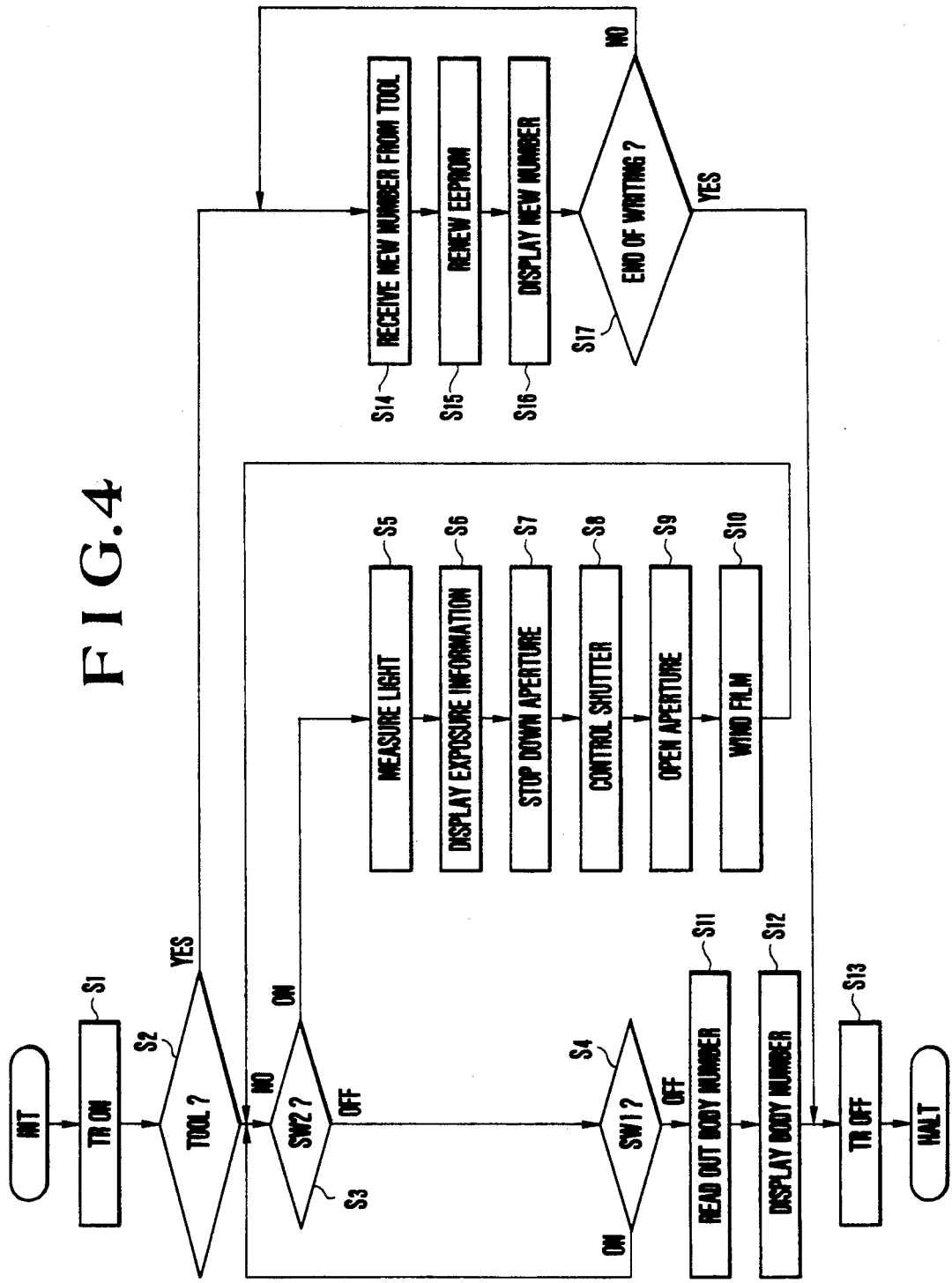
FIG. 4 is a flow chart showing the operation of the camera.

FIG. 4 shows in a flow chart the operating sequence of the microcomputer 1. The operation of the camera is described below with reference to the flow chart:

The microcomputer 1 is assumed to be normally in a halt mode and to become operative coming out of the halt mode upon occurrence of an interruption effected through a switch input. When the main switch SW1 of the camera is turned on, an interruption INT takes place to render the microcomputer 1 operative.

At a step S1, a low level signal is applied from the microcomputer 1 to the base of the transistor TR to turn on the transistor TR. The transistor TR then generates the power supply voltage V2. As a result, a given voltage is applied to each of the circuits 5 to 8, the EE- PROM 4, etc. At a step S2, a check is made for connection with the tool 9. The check for connection may be made in any suitable manner. For this purpose, the tool 9 may be arranged to supply some signal to one of input ports of the microcomputer 1. It is also possible to confirm the connection according to establishment of a specific communication. If the tool 9 is found not to be connected a normal camera operation is performed. In other words, the flow of operation proceeds to a step S3 to have the normal camera operation executed. At the step S3, a check is made to find if the release switch SW2 is in an on-state. If not, the flow proceeds to a step S4. At the step S4, the main switch SW1 is checked for its state. If the main switch SW1 is found to be in an on-state, the flow comes back to the step S3 as the main switch SW1 still remains in its on-state. The loop consisting of the steps S3 and S4 is repeated as long as this state continues. When the release switch SW2 is turned on under this condition, the flow of operation proceeds to a step S5. Then, a picture taking operation is carried out in a known manner at steps S5 to S10. In other words, a sequence of release processes is performed. At the steps S5 and S6, information on the luminance of external light is first obtained from the light measuring circuit 5. A predetermined exposure computing operation is performed on the basis of the information on the luminance of the external light. Then, a shutter speed and an aperture value are computed. Information on the values which are obtained on the basis of the results of computation is supplied to the liquid crystal driver 2. This causes the liquid crystal display device 3 to display these values. FIG. 1(a) shows an example of the display.

At the step S7, the aperture is stopped down according to the computed aperture value. At the step S8, the shutter is controlled according to the computed shutter speed value. An exposure is then completed. Next, the flow comes to the step S9 to bring the aperture back to its full open position. The flow then comes to the step S10 to wind the film and charge an applicable mechanism of the camera. With the sequence of release operation coming to an end, the flow comes back to the step S3.

When the main switch SW1 is turned off under the loop condition of the steps S3 and S4, the microcomputer 1 detects this at the step S4. The flow of operation comes to the step S11. At the step S11, information on the body number, etc., stored in the EEPROM 4 is read out. At a step S12, the information on the body number, etc. is supplied to the liquid crystal driver 2 to cause the liquid crystal display device 3 to display it. FIG. 1(b) shows an example of this display.

At a step S13, the transistor TR is turned off to cut off the power supply V2 by making the level of the base of the transistor TR high.

The microcomputer 1 then again comes back to its halt state and waits for an interruption brought about by the main switch SW1. The normal camera operation is performed in the above-stated manner. The liquid crystal display device 3 is arranged to display the body number, etc. when the main switch SW1 is in an off-state.

In a case where the connection with the tool 9 is detected at the step S2, the microcomputer 1 comes out of the camera operation mode to take a mode for communication with the tool 9. At a step S14, information on a new body number, etc. set at the tool 9 is received from the tool 9. At a step S15, information on an old body number, etc. stored in the EEPROM 4 is replaced with the information newly obtained.

At a step S16, the information on the new body number, etc. is supplied to the liquid crystal driver 2 to have it displayed by the liquid crystal display device 3 for confirmation of the renewal of the body number, etc. Assuming that the renewal is made by adding a suffix to the body number, for example, a display indicative of the new body number becomes as shown in FIG. 1(c). At a step S17, a check is made for an end of the communication with the tool 9. If the communication is found not completed as yet, the flow comes back to the step S14 to repeat the above-stated processes. If it is found to have been completed, the flow comes to the step S13 to halt the microcomputer 1 as described above.

The identification information showing the body number, etc., which is stored in the EEPROM 4 can be renewed and changed by using the tool 9 in the above-stated manner. After the renewal, the microcomputer 1 operates in the camera mode. Then, when the main switch SW1 is turned off, the flow comes to the step S11. At steps S11 and S12, the information on the new body number, etc. is read out and displayed.

In addition to the body number, the information which is supplied to the EEPROM 4 may include, for example, the particularities of the camera such as the time of manufacture, the place of manufacture, etc.

As described in the foregoing, the embodiment of this invention is provided with a memory which is arranged to store identification information peculiar to an individual camera such as the camera body number, etc., and a display device which is arranged to display the information. This effectively prevents such information from being lost when an exterior part of the camera is replaced. Another advantage of the embodiment is that the arrangement to use the display device also for displaying exposure information prevents an increase in cost. A further advantage of the embodiment lies in the ability to rewrite the information. For example, a suffix can be added to the body number according to the history of repair. In addition to that, the body number can be changed when an internal memory is upgraded. The invented arrangement thus facilitates identification of each individual camera product.

What is claimed is:

1. A camera comprising:
   a) a light measuring circuit;
   b) a computing circuit for computing exposure on the basis of an output of said light measuring circuit;
   c) an exposure control circuit for controlling exposure on the basis of a shutter time value or a diaphragm value expressed by the computed value of the computing circuit;
   d) a display circuit containing in the camera to display the computed value of the computing circuit, said computing circuit operating before a photographing operation starts;
   e) a memory for storing identification information peculiar to the camera; and
   f) a control circuit which transmits the identification information stored by the memory and has the information displayed by the display displaying the computed value.

2. A camera according to claim 1, wherein said identification information is at least one of the body number of the camera, the time and place of manufacture of the camera.

3. A camera according to the claim 1 wherein said identification information is written on the memory exteriorly thereof by a tool.

4. A camera according to claim 1, wherein the memory is an EEPROM.

* * * * *